United States Patent [19]

Koch

[11] 4,291,896
[45] Sep. 29, 1981

[54] ADJUSTABLE STEERING WHEEL AND CONTROL LEVER CONSOLE

[75] Inventor: Otto E. Koch, Springfield, Ill.

[73] Assignee: Fiat-Allis Construction Machinery, Inc., Deerfield, Ill.

[21] Appl. No.: 90,567

[22] Filed: Nov. 2, 1979

[51] Int. Cl.³ .............................................. B62D 1/18
[52] U.S. Cl. ..................................... 280/775; 74/493; 180/334
[58] Field of Search .................. 280/775, 779; 74/493; 180/334

[56] References Cited

U.S. PATENT DOCUMENTS 3,628,396  12/1971  Grobowski .......................... 280/775
3,737,003  6/1973   Beals ..................................... 180/78

Primary Examiner—David M. Mitchell
Assistant Examiner—John A. Carroll
Attorney, Agent, or Firm—August E. Roehrig, Jr.; Robert A. Brown

[57] ABSTRACT

An adjustable steering wheel and control lever console which is movable fore and aft of an operator about a pivot axis to a desired locked position. The console further provides a pivotal mounting of the steering wheel housing to allow the steering wheel to be adjusted independently of the console. Separate lock release mechanisms permit the operator to release the console or steering wheel from a locked position for the selected adjustable movement. Adjustability of the console and steering wheel is effected through manipulation of separate release devices.

16 Claims, 7 Drawing Figures

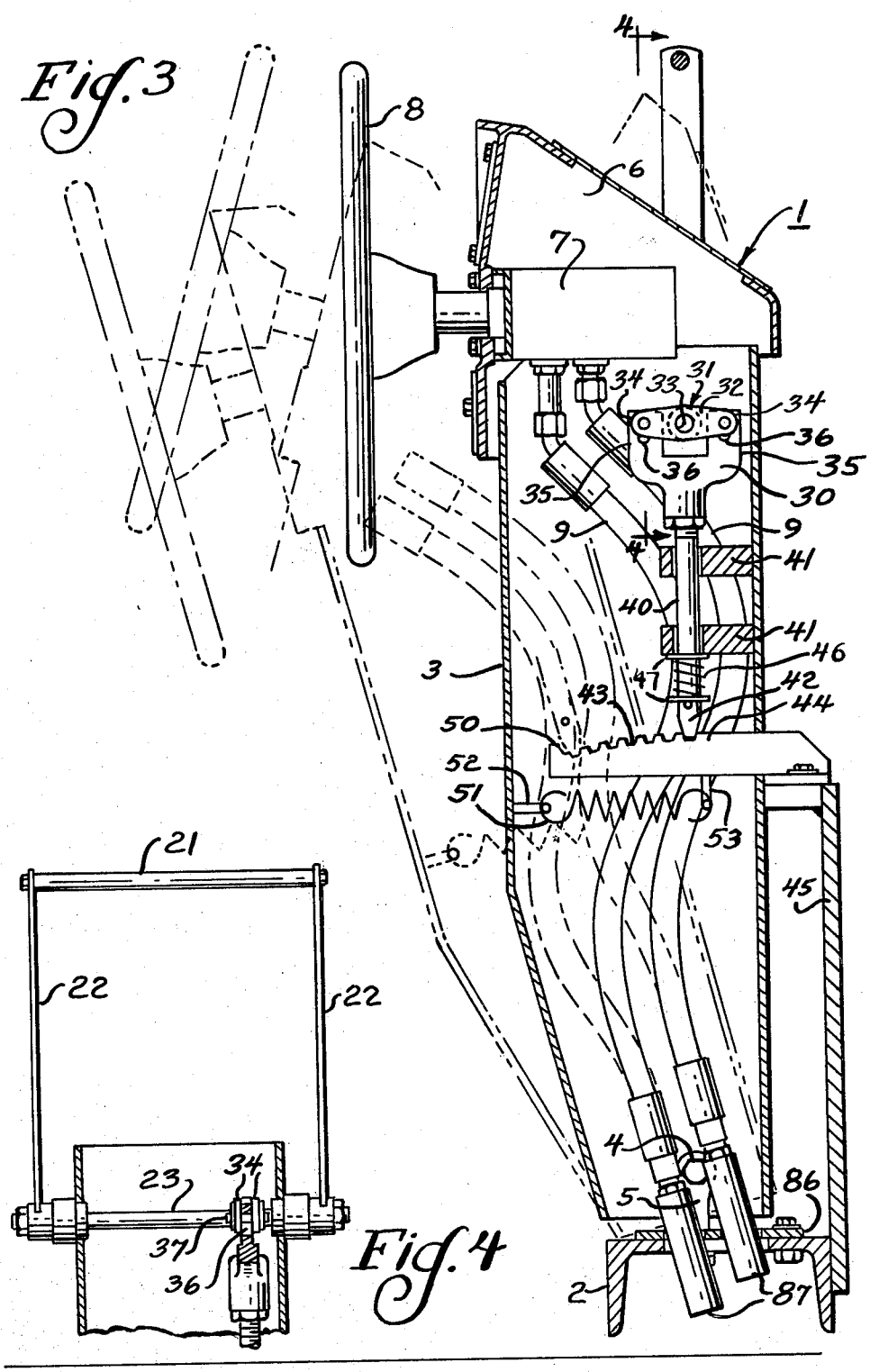

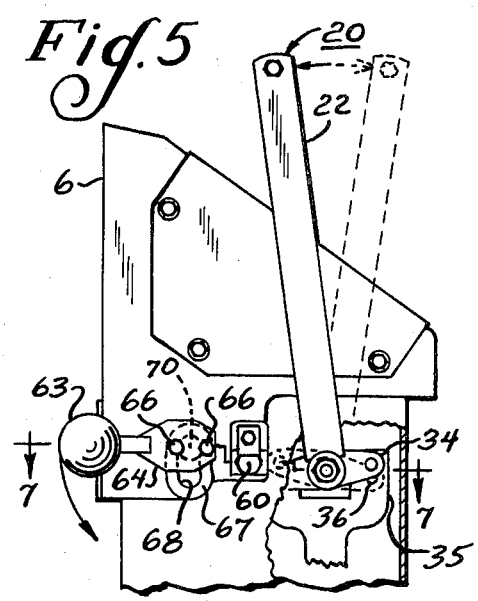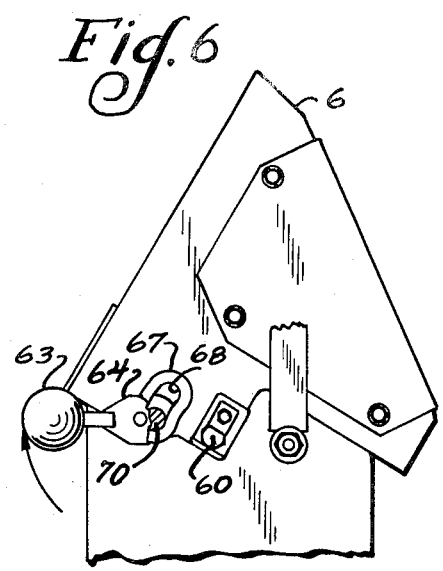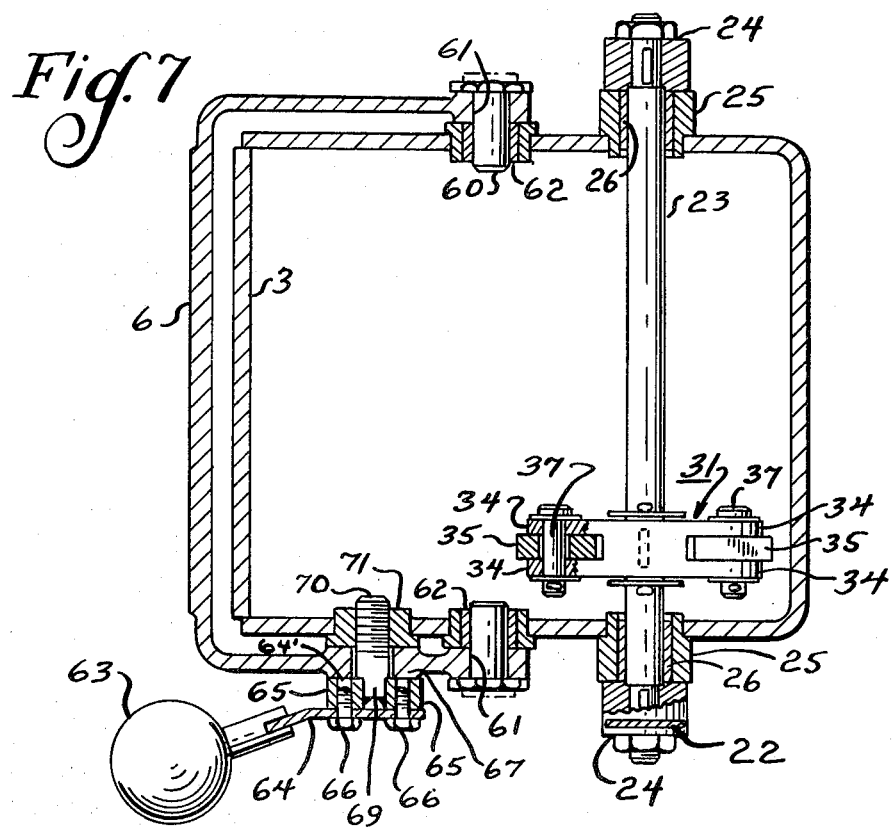

ADJUSTABLE STEERING WHEEL AND CONTROL LEVER CONSOLE

BACKGROUND OF THE INVENTION

This invention relates in general to vehicle control consoles and, in particular, to a vehicle control console capable of adjustable positioning relative to an operator.

More specifically, but without restriction to the particular use which is shown and described, this invention relates to an adjustable steering wheel and control lever console of a vehicle which is adjustable fore and aft of an operator about a substantially horizontal axis to vary its angular orientation. The console of the invention further includes means to adjust independently the tilt of the steering wheel relative to the console.

In the operation of construction and industrial machinery, such as, for example, motor grader vehicles, it is highly advantageous to provide adjustable positioning of the steering wheel and vehicle control levers relative to the operator for convenient access and manipulation. Several techniques have been employed in the past to accomplish at least adjustability of the steering wheel for limited movement relative to the operator. Such limited adjustment of the steering wheel alone does not adequately compensate for actual conditions encountered in operation of road graders and the like.

For example, it is desirable and necessary in the operation of certain industrial and construction machinery that an operator either stand or be in a sitting position, at which alternate positions prior art control consoles do not satisfactorily accommodate an operator in relation to effective manipulation of the steering wheel and control lever. The lack of convenient adjustability of the vehicle control console tends to obstruct an operator's visibility, particularly in the sitting position, and otherwise interfere with or unduly inhibit access to the controls of the vehicle.

Attempts to overcome these and other problems are disclosed in U.S. Pat. No. 3,737,003 to Beals, et al. However, the adjustable control console for a vehicle described and illustrated in the Beals, et al patent does not provide optimum flexibility and adjustment of both steering wheel and control levers of the console which is desirable in the operation of construction equipment such as motor graders.

SUMMARY OF THE INVENTION

It is therefore an object of this invention to improve vehicle control consoles.

Another object of this invention is to mount a control console on a vehicle for selective movement relative to an operator.

A further object of this invention is to mount a steering wheel on an adjustable vehicle console for selective one hand adjustment relative to the operator.

A still further object of this invention is to improve the operator comfort and convenience in operation of construction vehicles.

A still further object of this invention is to increase visibility of an operator of construction vehicles.

These and other objects are attained in accordance with the present invention wherein there is provided an adjustable steering wheel and control lever console which is movable fore and aft of an operator about a pivot axis to a desired locked position. A lock release means permits the operator to release the console from a locked position for the selected adjustable movement.

The console also is provided with a steering wheel mounting means which is pivotally mounted on the console for adjustment independent of the console.

DESCRIPTION OF THE DRAWINGS

Further objects of the invention together with additional features contributing thereto and advantages accruing therefrom will be apparent from the following description of a preferred embodiment of the invention which is shown in several drawings with like reference numerals indicating corresponding parts throughout wherein:

FIG. 3 is a side elevational view, with parts in section, of the adjustable steering wheel and control lever console of FIG. 1;

FIG. 4 is a front sectional view taken along line 4—4 of FIG. 3;

FIG. 5 is a partial side elevational view, with parts broken away, of the adjustable steering wheel housing and release handle of the adjustable steering wheel and control lever console of FIG. 1;

FIG. 6 is a partial side elevational view of the adjustable steering wheel housing of FIG. 5 with parts removed and in an adjusted position relative to the console; and FIG. 7 is a top sectional illustration of the adjustable steering wheel and control console taken along line 7—7 of FIG. 2.

DESCRIPTION OF THE PREFERRED EMBODIMENT

Figure 1:
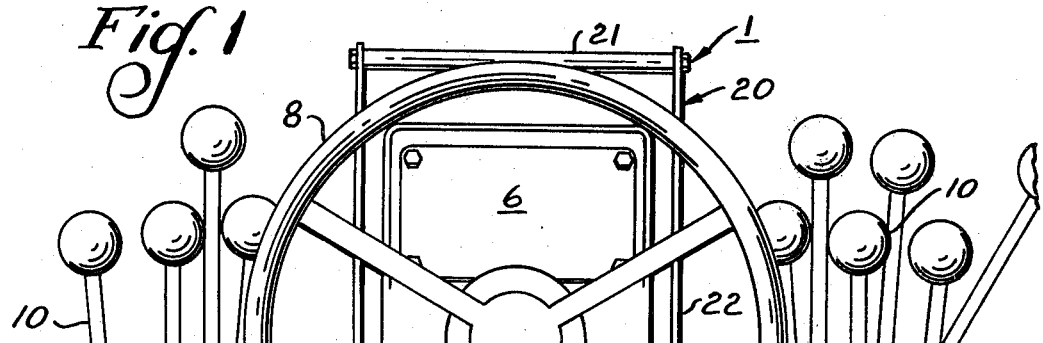
FIG. 1 is a back elevational view, with parts in section, of the adjustable steering wheel and control lever console of the invention.
Figure 2:
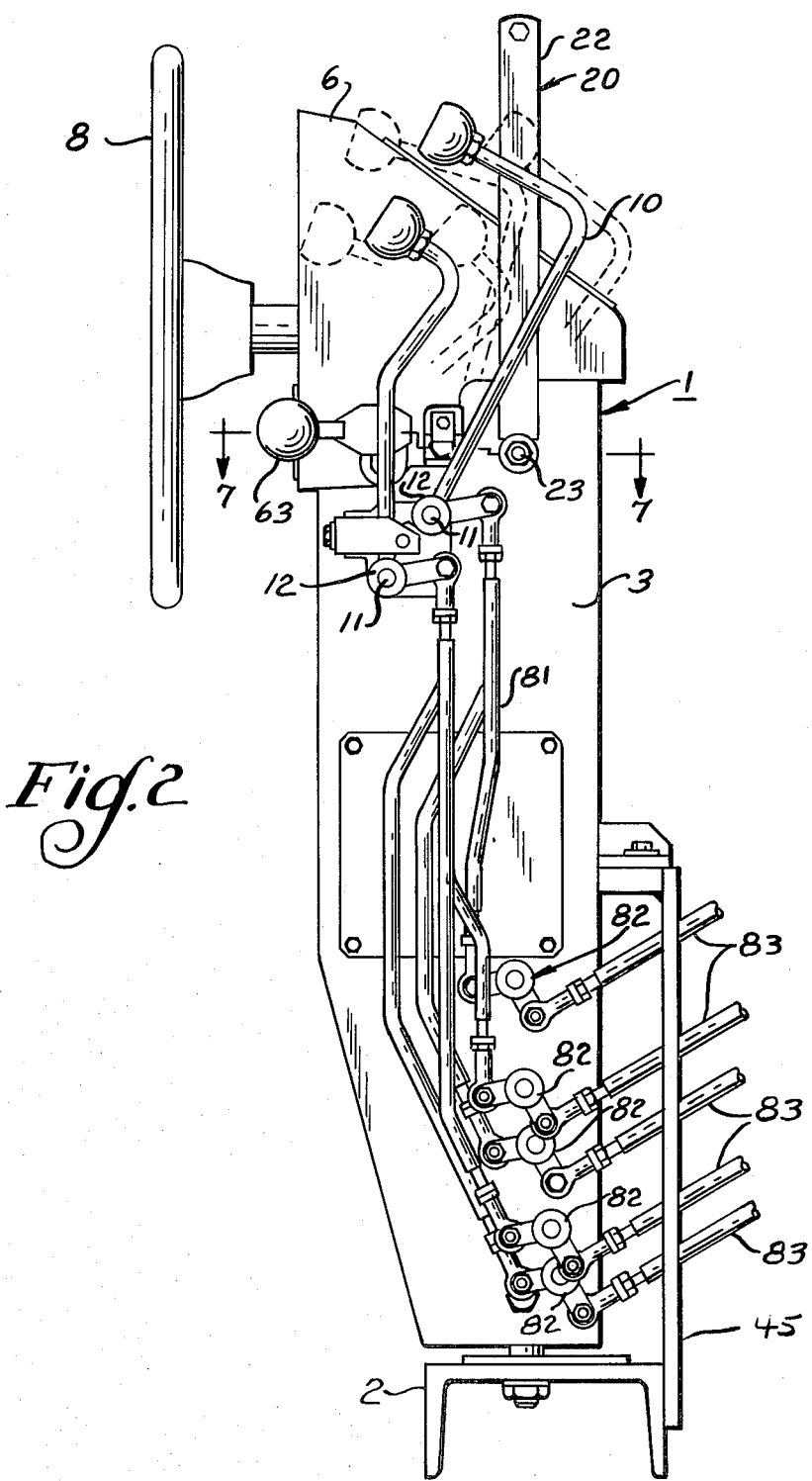
FIG. 2 is a side elevational view of the adjustable steering wheel and control lever console of FIG. 1.

Referring now to FIGS. 1, 2, and 3 there is shown the adjustable steering wheel and control lever console of the invention mounted on the floor of a vehicle at a position forward of the operator thereof. Although not intended to be so limited, the adjustable steering wheel and control console of the invention may be used in conjunction with construction and industrial machines such as, for example, road graders and the like. The vehicle in which the console of the invention is utilized may be of conventional construction and further description thereof is not necessary for an understanding of this invention.

The adjustable steering wheel and control lever console 1 is mounted on a floor member 2 disposed laterally of the vehicle (not shown). The console 1 includes an upright tower 3 which is pivotally mounted near its bottom about a pair of lateral shafts 4 extending through two upstanding brackets 5 bolted to the floor member 2. Tower 3 is in the form of a four-walled housing whereby the lower wall confronting the operator has a sloped portion as best shown in FIGS. 2 and 3. The upper end of tower 3 is enclosed by a steering wheel housing or hood 6 containing a typical vehicle steering wheel unit 7 and mounting a steering wheel 8 coupled thereto. The bottom portion of steering wheel housing 6 is disposed around the exterior upper portion of tower 3. A plurality of hydraulic fluid lines 9 extend downward from the steering wheel unit 7 into tower 3 for fluid communication with the vehicle steering system.

As shown in FIGS. 1 and 2, a plurality of control levers 10, which operate the control valves of the vehicle in a conventional manner, are positioned on each side of the tower 3 for connection thereto for pivotal movement on respective shafts 11. As is most clearly shown in FIGS. 1 and 2, pivotal movement of the control levers 10 is provided by suitable coupling of the levers to exterior movable sleeves and crank arms 12 journalled on shafts 11. The console of the invention may accommodate any number of control levers 10 depending on the particular vehicle with which the invention is used.

The tower 3 is capable of selected adjustable and angular movement toward and away from the operator through the manipulation of a console release and adjustment handle 20 situated above steering wheel housing 6. Adjustment and release handle 20 is comprised of an upper lateral handle 21 and a pair of downwardly extending members 22 attached on opposite sides of the exterior of steering wheel housing 6 by a sleeve and nut arrangement 24, best shown in FIG. 7. Rod 23 extends a length greater than the width of tower 3 and is journalled thereon for rotation by sleeves 25 coupled to aligned openings in tower 3 and supporting bearings 26 as shown in FIGS. 4 and 7. The rod 23 extends through the upper open end of a yoke 30, situated within tower 3, and is attached thereto by a yoke actuating lever 31, as seen in FIGS. 3, 4 and 7. The yoke actuating lever 31 comprises a central body 32 having an opening 33 through which the rod 23 is disposed in fixed relationship. Two pairs of integral and oppositely projecting spaced lever arms 34 of lever 31 embrace opposed end portions 35 of the open end of yoke 30. The end portions 35 of the yoke 30 include respective elongated slots 36 in which respective pins 37, coupled to spaced arms 34, are positioned for movement. Movement of the handle 20 toward and away from the operator will rotate the rod 23 about its axis, and rock the yoke actuating lever in the direction of movement of the handle. Dependent on the direction of movement, rocking of yoke actuating lever 31 causes the yoke 30 to move upward through cooperation of the pins 37 and slots 36.

The bottom of yoke 30 is attached to an elongated rod 40 through a threaded engagement while rod 40 is supported on the front wall (relative to the vehicle) of the tower housing 3 by means of a pair of brackets 41 for movement in a direction perpendicular to the pivotal axis of the console. The lower end of the elongated rod 40 is formed as a tapered flat 42 adapted to be inserted in one of a plurality of notches 43 provided in a curved upper surface of notched rack 44. The notched rack 44 is bolted on a vertically disposed plate 45 physically affixed at its bottom edge to the floor member 2 (FIG. 3). It should be apparent that positioning of the rod in a selected slot provides a range of adjustable orientations of tower 3 in relation to the operator depending upon which of the notches the rod engages. Although six notches are shown in connection with the rack of FIG. 1, it is within the scope of the invention to use other number of notches to increase and decrease the number of possible adjustable positions as desired.

To move the console from one angular adjusted position to another, an operator may apply a force to handle 20 to cause yoke 30 to lift the end of rod 40 from engagement with a notch 43 so that the tower may be adjusted toward and away from the operator. In either situation, movement of handle 20 in either direction causes the yoke actuating lever 31 to rock either clockwise or counterclockwise and raise the rod 40 from engagement with a notch for release of tower 3. After movement of the tower 3 to a desired position, such as shown in phantom in FIG. 3, removal of the force on handle 20 causes the tapered flat 42 of rod 40 to move automatically downward into engagement with a notch 43 corresponding to the orientation of the console. Such re-engaging movement of the rod 40 is effected by means of a compression spring 46 disposed between the bottom surface of the lower mounting bracket 41 and a washer 47 carried on the rod.

Movement of the console toward the operator is limited by a stop 50 projecting upward on an upper edge of rack 44 as shown in FIG. 3. A counterbalancing spring 51 is disposed between a spring retention bracket 53, located on the bottom of the notched rack 44, and a spring retention bracket 52 attached to a housing wall.

From the foregoing, it should be apparent that movement of tower 3 about its lower pivot axis as heretofore described will alter the orientation of the steering wheel 8 relative to the operator. The adjustable steering unit and control lever console of the invention is further capable of limited adjustable movement of the steering wheel 8, independent of the angle of orientation of the tower 3. To accomplish such adjustment of the steering wheel 8, the steering wheel housing 6 is pivotally mounted on the tower housing by a pair of pins 60 (as shown in FIGS. 5, 6 and 7) to pivot about an axis parallel to the pivotal axis of the tower. Pins 60 are retained by respective pin receiving openings 61 of steering wheel housing 6, and are mounted for rotation on tower 3 through sleeve and bearing arrangement 62 as seen in FIG. 7. Selective movement of steering wheel housing 6 is selectively controlled by means of a steering wheel adjustment knob 63, disposed adjacent one side of the console of the invention as shown in FIGS. 1 and 2.

Referring now to FIGS. 5, 6, and 7, the adjustment knob 63 is attached to a lever 64 at a bent end portion thereof, orienting the knob 63 away from the console for convenient access by an operator. Lever 64 is releasably attached to a tubular element 65 by screws 66 extending through apertures formed in lever 64 and received in a selected pair of threaded holes 64' formed through and spaced about an outer perimeter portion of the element 65. By this arrangement, element 65 is adapted to bear against a raised portion 67 of steering wheel housing 6 surrounding an elongated curved slot 68 formed therein. The element 65 is further rigidly attached to a notch head 69 of a bolt 70 positioned therebetween as illustrated in FIG. 7. A threaded end of bolt 70 engages a nut member 71 attached to tower housing 3 while the intermediate portion of bolt 70 is disposed in slot 68. The steering wheel adjustment knob 63 acts as a quick release mechanism whereby when the bolt 70 is tightened, an end of element 65 frictionally contacts the side wall of the steering wheel housing to retain it in position relative to tower 3. Movement of bolt 70 by an operator releases the frictional force retaining the steering wheel housing to permit limited movement of the steering wheel housing and steering wheel within the slot 68, independent of tower 3. Several of the adjustable positions of steering wheel 8 are shown in phantom in FIG. 3.

Tubular element 65 has formed therein a plurality of pairs of holes 64' as shown in FIG. 7. Accordingly, it is possible upon removal of screws 66 from element 65, to rotate lever 64 to another selected position and secure it thereat by replacing screws 66 in another pair of holes 64'. In this manner, it can be seen that lever 64 can be rotated with respect to element 65 and adjustably positioned and secured thereto at any of a number of preselected locations.

Referring to FIGS. 1 and 2, each of the control levers 10 is coupled through rods 81 to a bell crank 82 supported on a vertical bracket 82'. Each bell crank 82 operates a respective actuating rod 83, extending through vertical plate 45, for coupling to the control valves of the vehicle in a conventional manner. The pivot point of each rod 81, with its respective bell crank 82, is located in a manner to provide minimal movement of the levers 10 when the tower is adjustably positioned by manual manipulation of the console adjustment handle. In addition, as shown in FIG. 3, the hydraulic hoses 9 of the steering unit extend downwardly in tower 3 and through a plate 86 mounted to the floor member 2. The hose connectors 87, which receive the end of the steering unit hoses 9, are disposed relative to the plate 86 and floor member 2 at an angle of orientation to keep hose movement to a minimum when tipping tower 3 or independently pivoting the steering wheel housing. The connectors 87 also act to seal the lower areas against the passage of air and dirt.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Thereof, it is intended that the invention not be limited to the particular embodiment disclosed as the best mode contemplated for carrying out this invention, but that the invention will include all embodiments falling within the scope of the appended claims.

What is claimed is:

1. A steering unit and control lever console for a vehicle comprising
    tower means for supporting a vehicle steering wheel unit and at least one vehicle control lever,
    bearing means pivotally mounting said tower means in an upward position on a vehicle for movement about a transverse axis to adjust the position of said tower means,
    steering wheel housing means selectively retaining the vehicle steering wheel in a fixed position on said tower means,
    steering wheel housing means selectively retaining the vehicle steering wheel in a fixed position on said tower means,
    said steering wheel housing means including adjustment means to permit selective pivotal movement of said steering wheel housing means relative to said tower means for adjustment of the position of the vehicle steering wheel,
    locking means for locking said tower means against pivotal movement upon movement of the tower means to an adjusted position,
    release means for disengaging said locking means and pivotally moving said tower means to an adjusted position,
    said release means including handle means pivotally mounted on a rotatable shaft and being manually movable in a selected direction for rotating said shaft and moving said tower means to an adjusted position,
    said release means further including yoke means operatively coupled to said locking means to disengage said locking means upon rotation of said rotatable shaft by said handle means, and
    said yoke means being coupled for rocking movement on said shaft to permit said disengagement of said locking means in either selected direction of movement of said handle means.

2. The console according to claim 1 wherein said locking means includes a notched rack attached in fixed relationship to said tower means.

3. The console according to claim 2 wherein said notched rack is oriented transversely to the upright tower means.

4. The console according to claim 3 wherein said notched rack includes a plurality of upper notches to provide respective adjusted positions.

5. The console of claim 4 wherein said locking includes a rod coupled to said yoke means and having an end to engage a selected one of said plurality of notches, said rod being caused to disengage said one of said plurality of notches upon rotation of said shaft by said handle means.

6. The console according to claim 5 wherein said lock means includes resilient means to automatically engage said end of said rod with one of said notches corresponding to said adjusted position.

7. The console according to claim 6 wherein said notched rack includes stop means limiting the pivotal movement of said tower means.

8. An adjustable control console for a vehicle comprising
    tower means for supporting control devices of a vehicle for manipulation by a vehicle operator,
    said tower means including an upright tower pivotally mounted to the vehicle for pivotal movement fore and aft of the vehicle operator about a pivot axis at its lower end,
    rack means rigidly coupled to said tower means,
    said rack means having a plurality of notches corresponding to a respective adjusted position of said tower fore and aft of the vehicle operator,
    a lock member for engagement with a notch of said rack means to retain the tower in one of said adjusted position,
    release means operatively coupled to said tower means and said locking member to disengage said locking member from a notch of said rack means and permitting movement of said tower means to another adjusted position,
    said locking member having an end to be inserted in engagement with a notch of the said rack means,
    said release means includes a yoke member pivotally coupled to said locking member,
    said release means further includes a handle member operatively coupled to the yoke member and mounted for movement upon manipulation by the vehicle operator, said handle member acting to pivot said yoke member about a fixed axis and cause said end of said locking member to disengage a notch of said rack means to permit said fore and aft movement of said tower means, and
    said yoke member being pivotal about said fixed axis in first direction in response to initiation of said movement of said handle member in a first direction and being pivotal about said fixed axis in the opposite direction in response to initiation of said movement of said member in a second direction.

9. The console according to claim 8 wherein said release means includes a handle member positioned exteriorly of housing means.

10. The console according to claim 8 wherein said release means includes resilient means for urging the lock member toward said rack means.

11. The console according to claim 8 wherein said notches are positioned on an upper surface of said rack means.

12. The console according to claim 11 wherein the top surface of said rack means adjacent said notches defines a curved configuration approximately corresponding to the arc of movement of said tower means.

13. The console according to claim 8 wherein said tower means includes a steering unit housing supporting a vehicle steering element coupled to the upper portion of said tower means for movement therewith.

14. The console according to claim 13 wherein said housing means further includes steering wheel adjustment means for selectively tilting said steering unit housing relative to said tower means for adjustment of the steering wheel relative to an operator.

15. The console according to claim 14 wherein said steering wheel adjustment means includes at least one shaft mounting said steering unit housing to said tower means for selected tilting about an axis substantially parallel to the pivotal axis of said tower means.

16. The console according to claim 15 wherein said steering wheel adjustment means includes adjustment control means for fixedly coupling said steering unit housing to said tower means in a first position and for permitting tilting of said steering unit housing upon movement from said first position.

* * * * *